March 22, 1949.　　L. W. SCHUMACHER ET AL　　2,465,043
ATTACHMENT FOR CULTIVATORS
Filed Oct. 1, 1945　　　　　　　　　　　　　　2 Sheets—Sheet 1
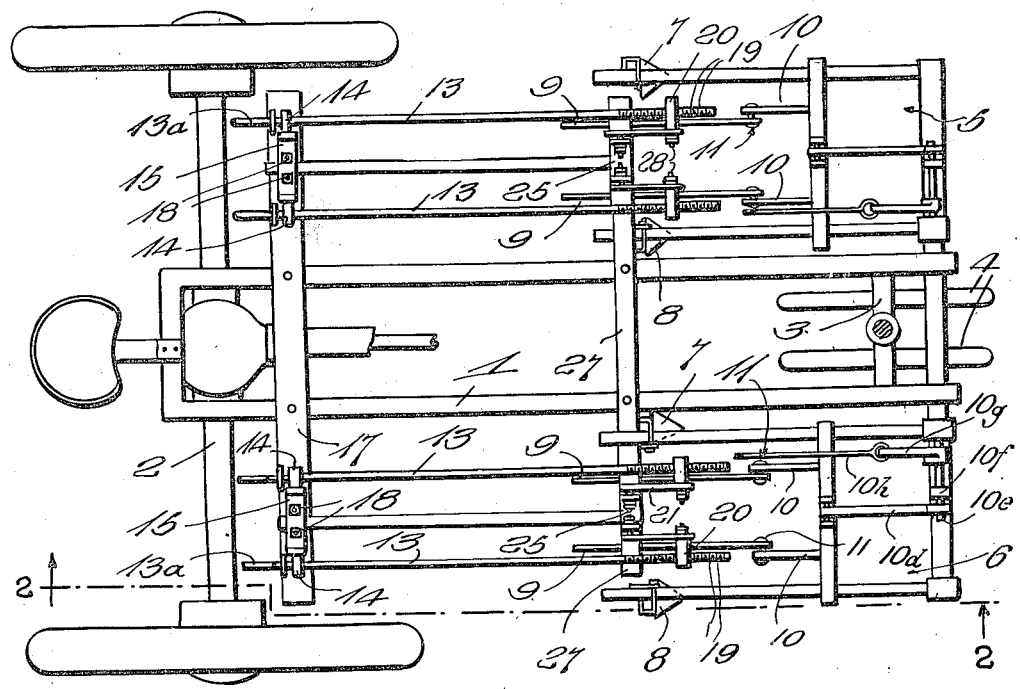
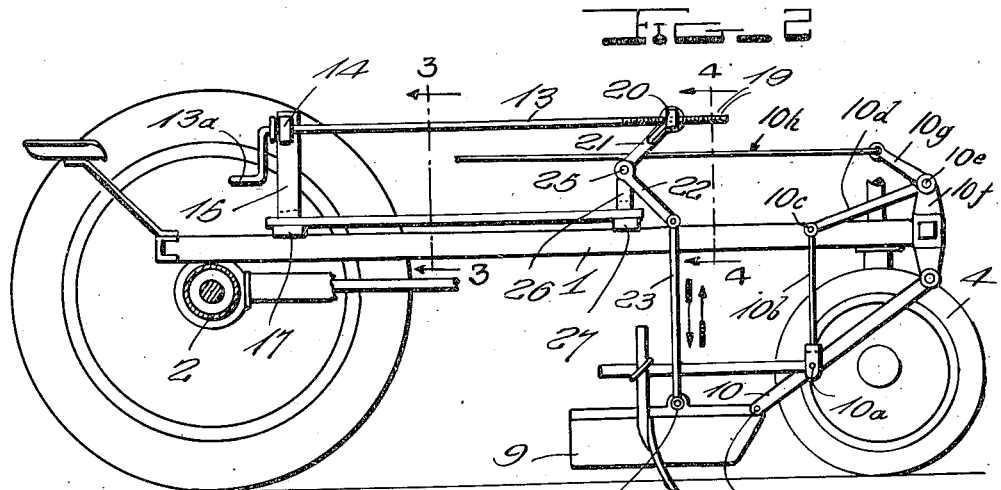
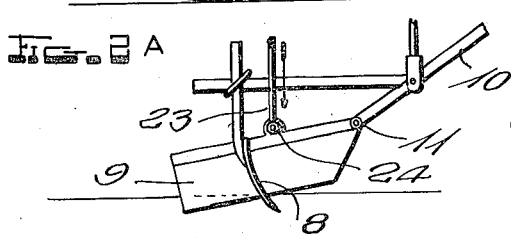
Inventors,
Leonard W. Schumacher,
and Victor J. Schumacher,
By Frank S. Appleman
Attorney

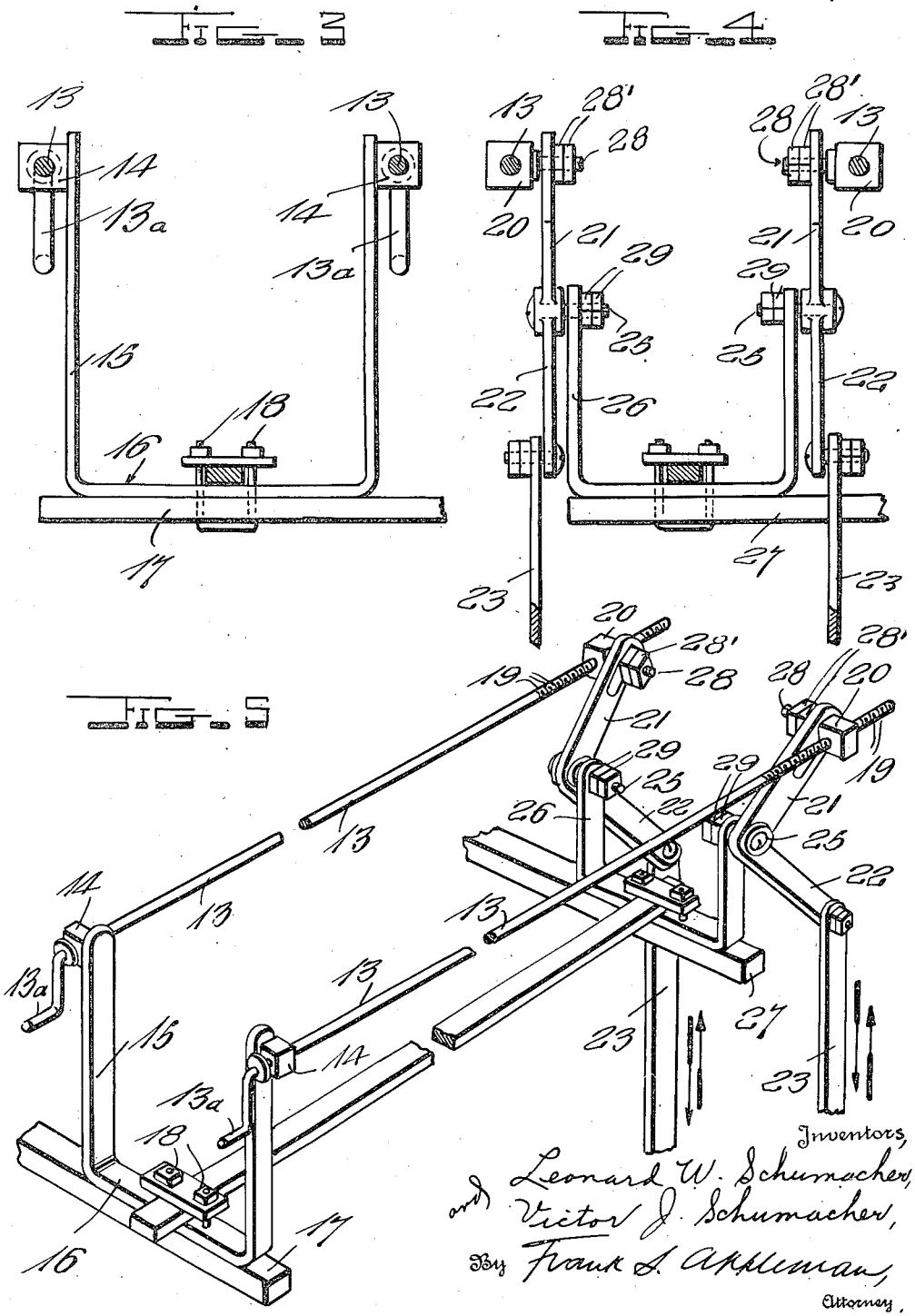

Patented Mar. 22, 1949

2,465,043

UNITED STATES PATENT OFFICE 2,465,043

ATTACHMENT FOR CULTIVATORS

Leonard W. Schumacher and Victor J. Schumacher, Carroll, Iowa

Application October 1, 1945, Serial No. 619,448

1 Claim. (Cl. 97—188)

This invention relates to shields for protecting rows of vegetation from the deposits of soil dislodged by the cultivator shovels so that the vegetation or plants are not fouled or covered by such dislodged earth.

An object of this invention is to provide novel means mounted on the frame or suspended from parts of a cultivator in such relation or position with relation to the cultivator shovels as they are caused to move or travel in proximity to the rows of vegetation, one on each side of said row, in order that the vegetation will be protected from being covered or impaired by soil or earth dislodged by the usual double shovel cultivator.

It is an object of the inventor to provide an attachment which may be applied to cultivators now in common use or which may be part of the installation of new equipment; and it is a further object of the invention to provide means accessible for manipulation by occupants of a riding cultivator or to operators of tractors equipped with such cultivators, for it is obvious that the cultivator may be animal drawn or mechanically propelled, and the inventors do not wish to be limited with respect to these installations.

It is a further object of the invention to provide side shields of the character indicated which can be expeditiously manipulated from the seat of the driver to lower or elevate the shields, and to provide means by which the degree of movement of the shields may be regulated or controlled; and it is furthermore the purpose to provide a device of this character comprising comparatively few and inexpensive parts which will prove efficient and satisfactory in use, as well as comparatively inexpensive to maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of a cultivator with the shield installed;

Figure 2 illustrates a vertical sectional view on the line 2—2 of Fig. 1;

Figure 2A illustrates a detail view showing the position of the shield when in operative position;

Figure 3 illustrates a sectional view on the line 3—3 of Fig. 2, omitting the seat and other parts beyond the bracket;

Figure 4 illustrates a sectional view on the line 4—4 of Fig. 2; and

Figure 5 illustrates a perspective view of the equipment adapted to be attached to cultivators.

In these drawings the chassis 1 of the cultivator may be of conventional form, and it is shown as mounted on a shaft 2 of a traction wheel and on a cross member 3 supported by the front wheels 4, but the inventors do not wish to be limited with respect to this arrangement of parts as the equipment as shown in Figure 5 may be installed on any means for its transportation. The invention is associated with the usual cultivator plow equipment such as 5 and 6, and in each case, coacting shovels 7 and 8 are spaced apart and are intended to straddle the rows of vegetation under cultivation. A shield 9 is mounted in close proximity to each shovel on the side of the shovel nearest the row of vegetation and it is pivotally supported on an arm 10 having its forward end suspended from the frame of the cultivator or other fixed part thereof. Each arm 10 has a pivot 11 on which the shield 9 oscillates and each arm 10 has a pivot 10a for a link 10b, which link is suspended on a pivot 10c from an arm 10d, and the arm 10d oscillates on a shaft 10e. The arm 10d oscillates on a pivot carried by the member 10f stationary on the frame. An arm 10g is secured on the shaft 10e and there is an operating member or rod 10h connected to the arm 10g. When the member 10h is pulled or pushed, it partially rotates the shaft 10e and it in turn operates the arm 10d and the link 10b so that the arm 10 is moved up and down and carries the shield up and down and it penetrates the soil or is elevated thereabove. Other means is provided for moving the shield up and down, as will presently appear. Each shield is manipulated by the operator through the use of a rod 13, having a handle 13a, the said rod being slidable in a guide or bearing 14 carried by a yoke 15, substantially U-shaped in form, and the base 16 of which is fastened to a cross beam 17 on the frame of the cultivator.

The means of securing the yoke or bracket may comprise bolts, such as 18, extending through the base of the yoke and the cross beam 17, or other means may be supplied for supporting the yoke. Each rod is provided with threads 19 in its outer end which engage a nut 20 so that the rod can be adjusted for increasing or diminishing the throw of the arm 21 in its operation. The nut is mounted on one arm 21 of a bell crank lever whose other arm 22 extends downwardly at appropriate angle, and the arm 22 is pivotally connected to a link 23 pivoted at 24 to the shield, so that by turning of the rod, the bell crank lever oscillates on a pivot 25 of a bracket 26 similar to that described in connection with the bracket or yoke 15, and it is likewise attached to the frame by a beam 27, or otherwise. The pivot 25 is held on the bracket by jamb nut 29.

The mounting of the nut 20 on the bell crank lever is by means of a threaded member 28 connected to the nut 20, which threaded member has jamb nuts 28' threaded on it.

The threaded member 28 is shown in dotted lines as extending through arm 21 and obviously, a hole is formed in the arm 21, the said hole being elongated longitudinally of the arm which affords movement of the threaded member 28.

We claim:

An attachment for cultivators comprising a U-shaped support mounted on a cultivator frame, a guide carried by each vertical leg of said support, a rod rotatable in each of said guides, a handle at one end of each rod, a threaded portion on the opposite end of each rod, a nut in which the threads of each rod are adjustable, a U-shaped bracket carried by the frame forwardly of said U-shaped support, a bell crank lever oscillatably mounted to each vertical leg of said bracket, means to slidably secure each nut to one arm of each bell crank lever, shields spaced from shovels of the cultivator and operative to guard rows of vegetation against the access of displaced earth thereto, an arm pivotally supported from the frame and having its free end pivotally connected to the front end of each shield, a link pivotally attached to the free arm of each bell crank lever and at the opposite end to the shield adjacent the upper edge of the shield and intermediate the ends of the shield so that rotation of each rod rocks the bell crank lever associated therewith to raise and lower the shield oscillatably with relation to the arm pivoted to the front end of the shield, a second arm pivotally mounted to the frame at a point above said first mentioned arm, a pivotal connection between said second mentioned arm and said first mentioned arm, and means to move said second mentioned arm about its pivot to the frame whereby the front end of the shield is adjusted vertically.

LEONARD W. SCHUMACHER.
VICTOR J. SCHUMACHER.

REFERENCES CITED

The following references are of record in the file of this patent:

UNITED STATES PATENTS

| Number | Name | Date |
|---|---|---|
| 746,653 | Adair | Dec. 15, 1903 |
| 1,532,920 | Munson | Apr. 7, 1925 |
| 1,612,379 | Kauffman | Dec. 28, 1926 |
| 2,175,512 | Adams | Oct. 10, 1939 |
| 2,220,338 | Koebel | Nov. 5, 1940 |
| 2,433,199 | Carter | Dec. 23, 1947 |

FOREIGN PATENTS

| Number | Country | Date |
|---|---|---|
| 88,018 | Austria | Apr. 25, 1922 |